United States Patent
Park et al.

(10) Patent No.: US 8,085,745 B2
(45) Date of Patent: Dec. 27, 2011

(54) METHOD FOR IMPROVING ENERGY EFFICIENCY IN WIRELESS MESH NETWORK

(75) Inventors: Sang Joon Park, Daejeon (KR); Young Bag Moon, Goyang (KR); Young Bae Ko, Suwon (KR); Sung Hee Lee, Suwon (KR); Seung Mok Yoo, Daejeon (KR)

(73) Assignees: Electronics & Telecommunications Research Institute, Daejeon (KR); Ajou University Industry Cooperation Foundation, Suwon, Gyeonggi-do (KR)

( * ) Notice: Subject to any disclaimer, the term of this patent is extended or adjusted under 35 U.S.C. 154(b) by 179 days.

(21) Appl. No.: 12/535,199

(22) Filed: Aug. 4, 2009

(65) Prior Publication Data

US 2010/0157827 A1 Jun. 24, 2010

(30) Foreign Application Priority Data

Dec. 18, 2008 (KR) ........................ 10-2008-0129161

(51) Int. Cl.
*H04W 4/00* (2009.01)
(52) U.S. Cl. ........ 370/338; 370/400; 370/406; 709/238; 709/243
(58) Field of Classification Search .................. None
See application file for complete search history.

(56) References Cited

U.S. PATENT DOCUMENTS

| | | | | |
|---|---|---|---|---|
| 5,987,011 A * | 11/1999 | Toh | ............................... | 370/331 |
| 6,975,613 B1 * | 12/2005 | Johansson | ..................... | 370/338 |
| 7,027,773 B1 * | 4/2006 | McMillin | ..................... | 455/41.2 |
| 7,142,524 B2 * | 11/2006 | Stanforth et al. | ............. | 370/328 |
| 7,428,229 B2 * | 9/2008 | Bonta et al. | ................... | 370/338 |
| 7,668,146 B2 * | 2/2010 | Levendel et al. | .............. | 370/338 |
| 7,787,361 B2 * | 8/2010 | Rahman et al. | ............... | 370/217 |
| 7,898,979 B2 * | 3/2011 | Isozu | ............................ | 370/254 |
| 2006/0029061 A1 | 2/2006 | Pister et al. | | |

(Continued)

FOREIGN PATENT DOCUMENTS

KR 2008-0014422 2/2008

OTHER PUBLICATIONS

"Wake-on-WLAN", World Wide Web Conference 2006, vol. 1, pp. 761-769, May 2006.

(Continued)

*Primary Examiner* — Donald Mills
(74) *Attorney, Agent, or Firm* — Kile Park Goekjian Reed & McManus PLLC

(57) ABSTRACT

A method for effectively using power resource in a wireless mesh network is disclosed to select and change a level of a power saving mode according to terminal and network situations to increase the duration of the network's existence as well as improve the power consumption of each mesh terminal. After active mesh terminals that are to perform a data relay function and super-saving mesh terminals that are not to perform the data relay function are selected in consideration of a network topology at certain periods, the level of a power saving mode of the mesh terminals selected as the super-saving mesh terminals is higher than that of the mesh terminals selected as the active mesh terminals. And then, a routing path in a tree form is formed along the mesh terminals selected as the active mesh terminals to transmit data.

12 Claims, 9 Drawing Sheets

U.S. PATENT DOCUMENTS

2006/0252443 A1 11/2006 Sammour et al.
2006/0253735 A1 11/2006 Kwak et al.
2007/0025274 A1* 2/2007 Rahman et al. ............... 370/254
2008/0037570 A1 2/2008 Kim et al.
2009/0010190 A1* 1/2009 Gong ............................ 370/311

OTHER PUBLICATIONS

"Power Saving Access Points for IEEE 802-11 Wireless Network Infrastructure", IEEE Transactions on Mobile Computing, vol. 5, No. 2, pp. 144-156, Feb. 2006.

* cited by examiner

METHOD FOR IMPROVING ENERGY EFFICIENCY IN WIRELESS MESH NETWORK

CROSS-REFERENCE TO RELATED APPLICATIONS

This application claims the priority of Korean Patent Application No. 2008-129161 filed on Dec. 18, 2008, in the Korean Intellectual Property Office, the disclosure of which is incorporated herein by reference.

BACKGROUND OF THE INVENTION

1. Field of the Invention

The present application relates to a method for effectively using power resources in a wireless mesh network capable of effectively selecting and changing a power saving mode of mesh terminals constituting a wireless mesh network according to a terminal and network situation, to thus reduce the power consumption of respective mesh terminals and maintain optimal network performance.

2. Description of the Related Art

A wireless mesh network is a network technique that provides a service such as Internet access or the like to multiple user terminals through multi-hop communications among wirelessly connected mesh routers.

Unlike a base station-centered mobile communication network or a hotspot-centered wireless local area network (WLAN), the mesh network transfers data through wireless multi-hop communications among mesh routers, having an advantage of facilitating a network extension and maintenance. Recently, diverse standardization groups, including IEEE 802.11s which is a group concerned with WLAN standards, have been working to try to introduce such a mesh network function.

The IEEE 802.11s standard has proposed a hybrid wireless mesh protocol (HWMP) for multi-hop routing. The HWMP protocol uses both a routing scheme in an on-demand AODV format (i.e., an AODV format based on a demand) and a scheme that periodically manages a routing path in a tree form. In order to manage the routing path in the tree form, a single root terminal exists in the network and periodically transmits a root announcement message to the entire network. In addition, a power saving mode is divided into a light sleep mode and a deep sleep mode to reduce the power consumption of a mesh terminal. A mesh terminal operating in light sleep mode periodically transmits a beacon frame and informs neighboring terminals that it has data to be transmitted via TIM information existing within the beacon. The mesh terminal operating in light sleep mode receives all the beacon frames from neighboring terminals, and if there is no data sent to the mesh terminal, the mesh terminal may turn off its transmitting/receiving device. However, in the case that there is data to be transmitted to the mesh terminal, the mesh terminal does not turn off the power of the transmitting/receiving device and receives the data. A mesh terminal operating in deep sleep mode does not need to receive the beacon frames of the neighboring terminals but receives only a DTIM beacon with a longer period. If a particular terminal has data to be sent to the mesh terminal operating in the deep sleep mode, it transmits the DTIM and then transmits the data to the mesh terminal while the mesh terminal is active. Except for this time duration, the mesh terminal operating in the deep sleep mode can always turn off its transmitting/receiving device's power, saving power resources.

However, the current standard does not define any substantial operating method concerning switching conditions between the both modes, namely, when deep sleep mode is to be used and when light sleep mode is to be used. If each terminal selects its mode one-sidedly without considering its relationship with the other network terminals and its own network connection status, side effects such as an increase in a delay time of the network and a reduction in throughput would be generated to end in a reduction in the existence duration of the network. Thus, a technique that can select a power saving mode of mesh terminals in consideration of these aspects is required.

SUMMARY OF THE INVENTION

An aspect of the present application provides a method for effectively using power resources in a wireless mesh network capable of effectively selecting and changing several levels of power saving modes provided by mesh terminals according to a terminal and network situation, to thus reduce power consumption of each mesh terminal as well as increase the duration of the network's existence.

According to an aspect of the present application, there is provided a method for using power resources in a wireless mesh network, including: a role discriminating step of discriminating (i.e., classifying) mesh terminals into active mesh terminals that are to perform a data relay function and super-saving mesh terminals that are not to perform a data relay function in consideration of a network topology; a power saving mode setting step of setting power saving modes such that a power saving mode of the mesh terminals selected as the super-saving mesh terminals is higher than that of the mesh terminals selected as the active mesh terminals; a routing path generating step of generating a routing path in a tree form along the mesh terminals selected as the active mesh terminals; and a data transmission step of transferring data along the generated routing path while the mesh terminals are in an active state, wherein the respective steps are repeatedly performed at every certain period.

The super-saving mesh terminals may be selected such that they are positioned at a single hop distance from one or more active mesh terminals.

While the super-saving mesh terminals are in the active state, a maximum backoff time duration of the mesh terminals selected as the active mesh terminals may be set to be longer than that of the mesh terminals selected as the super-saving mesh terminals to give priority of accessing radio resources to the super-saving mesh terminals.

The role discriminating step may include: periodically transmitting, by each mesh terminal, its single hop neighbor information and a metric value for selection of an active mesh terminal to a root terminal; constructing, by the root terminal, network topology information based on information received from each mesh terminal; selecting, by the root terminal, an active mesh terminal based on the constructed network topology information; and providing, by the root terminal, active mesh terminal selection information to every mesh terminal.

The metric value may be defined by the sum of the amount of residual power resource of each mesh terminal, a ratio of the terminals participating as the active mesh terminals, and link average quality with neighboring terminals, and may be represented by equation as shown below:

$$P_{score} = \alpha E_{residual} + \beta\left(1 - \frac{C_{count}}{N_{round}}\right) + \gamma\left(\frac{1}{n}\sum_{l=1}^{n} Q_l\right)$$

In the above equation, α, β, and γ and are weight values for determining a reflection rate of each item (i.e., clause), $E_{residual}$ is the amount of residual power resource of each mesh terminal, $$1 - \frac{C_{count}}{N_{round}}$$

is the rate of the mesh terminals participating as the active mesh terminals, $C_{count}$ is the number by which the mesh terminals are selected as the mesh terminals, $N_{round}$ is a total number of repeatedly performing the role discriminating step, and $$\frac{1}{n}\sum_{l=1}^{n} Q_l$$

is average quality of radio links in which 'n' is the number of neighboring terminals connected to each mesh terminal and Q1 is individual link quality with each neighboring terminal.

The selecting of the active mesh terminals may include: defining a set $S_A$ of terminals selected as active mesh terminals, a set $S_C$ of mesh terminals connected to the root terminal by the active mesh terminals, and a set $S_D$ of terminals which are not yet connected to the root terminal; including the root terminal in the set $S_A$ and moving every single hop neighboring terminal of the root terminal from the set $S_D$ to the set $S_C$; selecting a terminal having one or more neighboring terminals included in the set $S_D$ and having the highest metric value, as an active mesh terminal from the terminals included in the set $S_C$; and moving the terminal selected as the active mesh terminal to the set $S_A$ and moving all the single hop neighboring terminals of the terminal selected as the active mesh terminal from the set $S_D$ to the set $S_C$; repeatedly performing the active mesh terminal until such time as the set $S_D$ becomes a null set (i.e., empty set); and when the set $S_D$ becomes a null set, selecting an additional active mesh terminal from the terminals included in the set $S_C$ to distribute a routing path.

The active mesh terminal selection information may be included in a route announcement packet and transmitted to every mesh terminal.

The method for using power resource in a wireless mesh network may further include: a power saving mode changing step of changing, by each mesh terminal, its level of the power saving mode according to the amount of generated data while data is being transferred along the generated routing path.

The power saving mode changing step may include: measuring, by the mesh terminal, a queuing delay time of a data packet; calculating an exponentially weighted moving average (EMA) based on the measured queuing delay time; comparing the calculated EMA with one or more pre-set threshold values; and changing the power saving mode of the mesh terminal to a higher or lower level according to the comparison result.

The queuing delay time may be a time duration between a point when the data packet comes in a packet queue of the mesh terminal and a point when the data packet comes out of the packet queue but is not yet transmitted to a different mesh terminal. The EMA value is calculated by equation shown below:

$$EMA_{cur} = EMA_{prev} + \alpha S(QsDelay_{cur} - EMA_{prev})$$

In the above equation, $EMA_{prev}$ is a previously calculated EMA, $QsDelay_{cur}$ is a queuing delay time of a current packet, and 'α' is a parameter for determining how many pieces of the latest data are to be reflected ( $$\alpha = \frac{2}{(1+N)},$$

'N' is the number of pieces of data to be reflected).

BRIEF DESCRIPTION OF THE DRAWINGS

The above and other aspects, features and other advantages of the present application will be more clearly understood from the following detailed description taken in conjunction with the accompanying drawings, in which.

DETAILED DESCRIPTION OF THE PREFERRED EMBODIMENT

Figure 1:
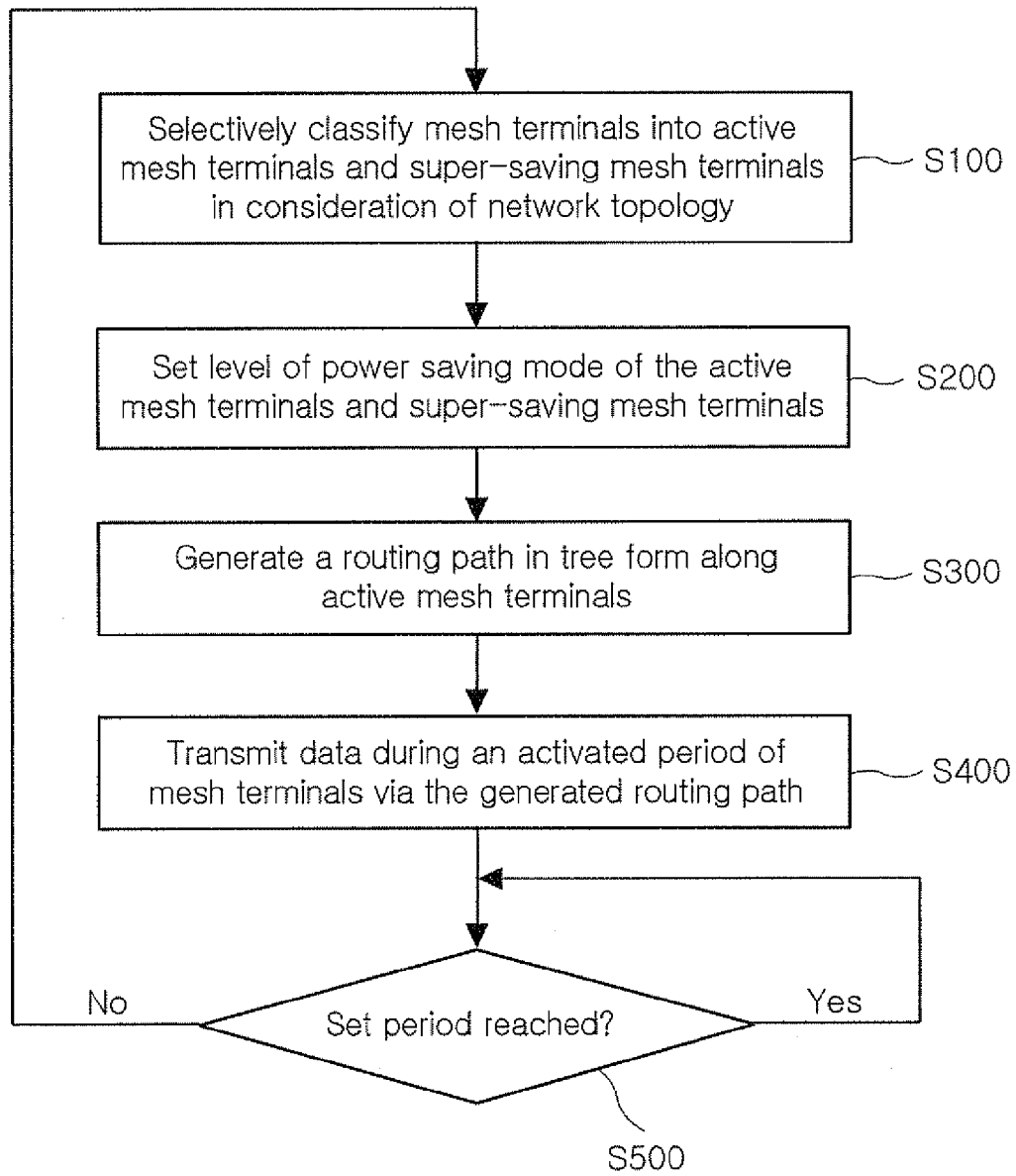
FIG. 1 is a flow chart illustrating the process of a method of using power resource in a wireless mesh network according to an exemplary embodiment of the present application.

Exemplary embodiments of the present application will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIGS. 1 to 4 are flow charts illustrating the method of using power resources in a wireless mesh network according to an exemplary embodiment of the present application. The method of effectively using power resource in the wireless mesh network according to an exemplary embodiment of the present application will now be described with reference to FIGS. 1 to 4.

FIG. 1 is a flow chart illustrating the process of a method of using power resource in a wireless mesh network according to an exemplary embodiment of the present application.

With reference to FIG. 1, in an exemplary embodiment of the present application, in order to effectively save power in a wireless mesh network including one or more mesh terminals supporting a power saving mode, the roles of the respective mesh terminals are discriminated in consideration of network topology (i.e., network form) (S100). In detail, among the mesh terminals constituting the wireless mesh network, mesh terminals serving to relay data are classified as active mesh (AM) terminals, while the other remaining mesh terminals are classified as super-saving mesh (SSM) terminals.

Each mesh terminal's power saving mode is set by reflecting the result of selection of the AM terminals in step S100. In more detail, the mesh terminals selected as the AM terminals are set to be in a lower level of power saving mode (e.g., light sleep mode) among supported power saving modes, and the other SSM terminals are set to be in a higher level of power saving mode (e.g., deep sleep mode). Namely, the AM terminals performing a data relay function consume more power of their own in order to guarantee a network connection, not to cause a delay time and to prevent degradation of throughput, and the SSM terminals that do not perform a data relay function save power as much as possible through the higher level of power saving mode.

Thus, in the exemplary embodiment of the present application, the selection of optimum AM terminals is a key factor for achieving the two targets of increasing the efficiency of power resources and maintaining network performance, and its detailed method will be described later.

A routing path in a tree form is generated along the selected AM terminals (S300), and data is transferred during an activation relay period during which the AM terminals are activated through the generated routing path (S400).

Accordingly, the performance of the wireless mesh network including the plurality of mesh terminals can be maintained and power can be effectively saved at each mesh terminal.

In addition, in the exemplary embodiment of the present application, the steps S100 to S400 are repeatedly performed at predetermined intervals (S500) to properly change the AM terminals and the routing path according to the power states of the respective mesh terminals, thus preventing depletion of a particular terminal's power resources and constantly maintaining the structure of the wireless mesh network.

Figure 5:
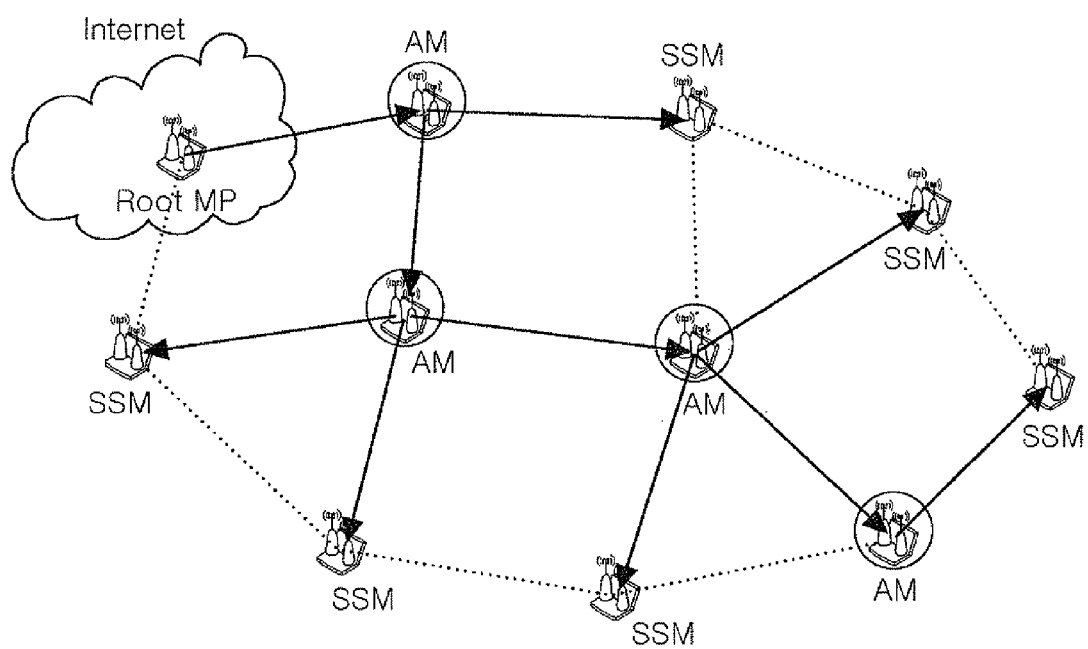
FIG. 5 illustrates a wireless mesh network according to the method for using power resource according to an exemplary embodiment of the present application.

FIG. 5 illustrates a wireless mesh network implemented according to an exemplary embodiment of the present application.

With reference to FIG. 5, it is noted that a routing path in a tree form is generated from a root terminal (root MP) along the terminals selected as the AM terminals. In addition, respective SSM terminals are located at a single hop distance from one or more AM terminals. Thus, the performance of the wireless mesh network can be maintained as it is.

Figure 6:
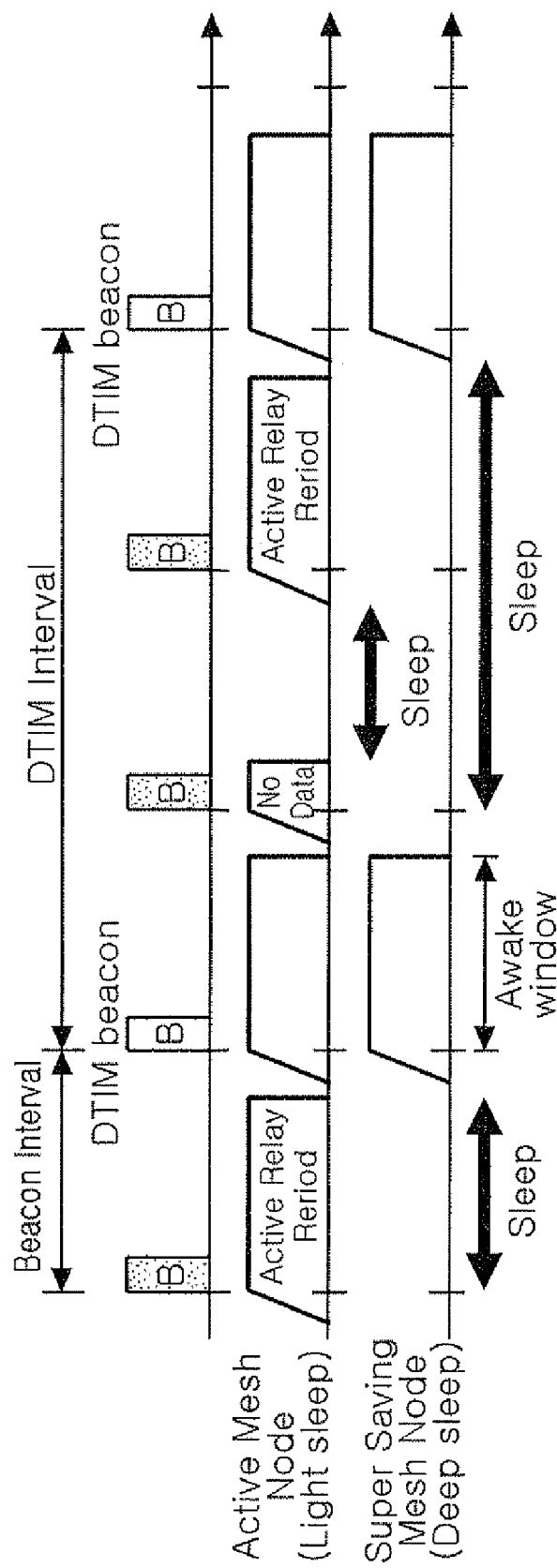
FIG. 6 illustrates data transmission intervals according to levels of power saving modes and a low power sleep in the power resource using method in a wireless mesh network according to an exemplary embodiment of the present application.

FIG. 6 illustrates transmission/reception states according to levels of power saving modes based on the roles of the respective mesh terminals. In this illustration, the power saving modes of the AM terminals and the SSM terminals are set as a light sleep mode and a deep sleep mode of IEEE 802.11s standard, respectively.

With reference to FIG. 6, the AM terminal (i.e., AM node) supplies power to its transmitting/receiving device at every beacon interval to transmit/receive data along with a beacon. In this case, the transmitted/received data includes the transmission/reception data of the AM terminal and the transmission/reception data destined for the other AM terminals and the SSM terminals. In the exemplary embodiment of the present application, the interval during which power is supplied to the transmitting/receiving device AM terminal to transmit/receive data is called an active relay period.

Meanwhile, the SSM terminals transmit/receive data only during a period (i.e., awake window) which a DTIM beacon is transmitted at every DTIM interval, and do not transmit/receive data during other periods. In this case, the awake window period is included in the activation relay period, during which, thus, the SSM terminals and the AM terminals are all in a transmission/reception state, so each of the SSM terminals may transmit its data to a neighboring AM terminal or each of the AM terminals may transmit its data to an SSM terminal.

During the active window period, a maximum backoff time of the AM terminals when they access radio resources may be lengthened more than a usual time (e.g., two-fold) in order to give the neighboring SSM terminals priority in accessing radio resources, rather than the AM terminals. This is to give priority of data transmission to the SSM terminals that transmit data during every DTIM period, which is longer than the beacon period, by which data transmission can be more smoothly performed.

Figure 2:
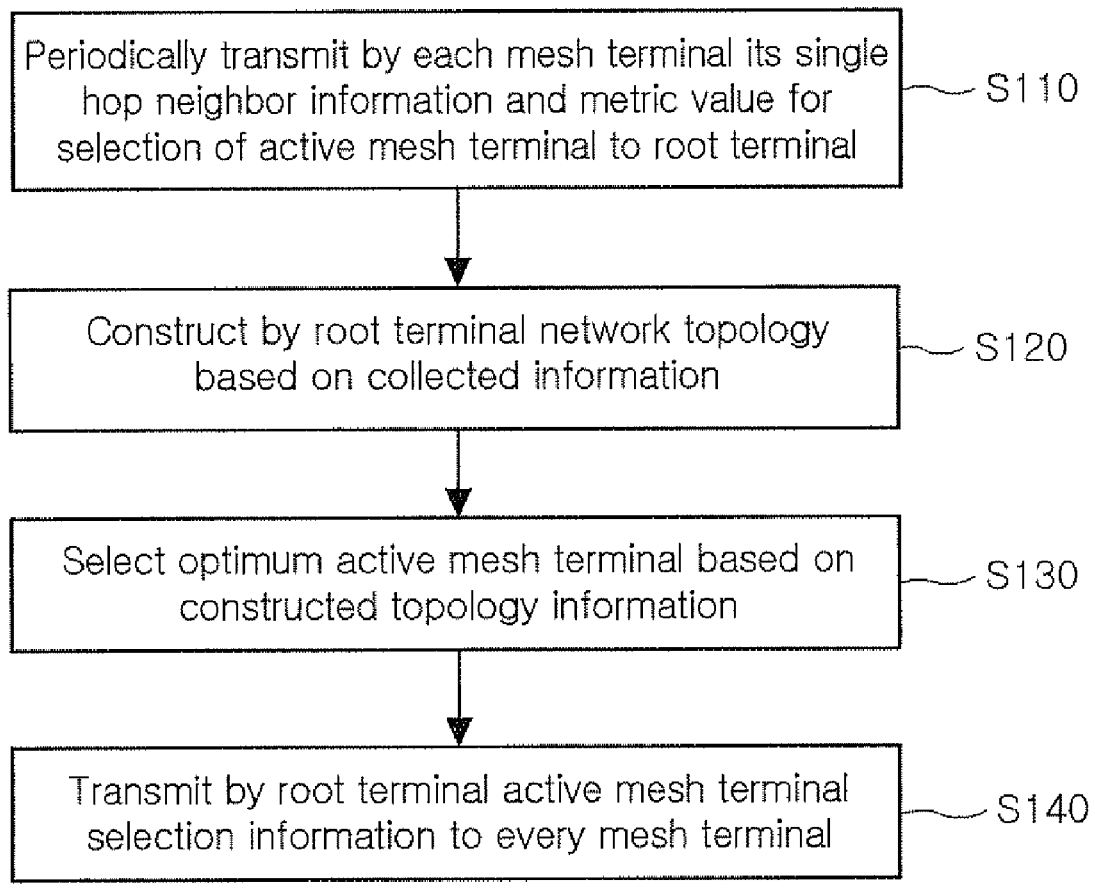
FIG. 2 is a flow chart illustrating the process of discriminating roles of mesh terminals in the power resource using method in a wireless mesh network according to an exemplary embodiment of the present application.

The method of selecting AM terminals from among the plurality of mesh terminals in step S100 is performed through several stages as shown in FIG. 2, and performing of all the steps as shown in FIG. 2 is defined as one round. In the exemplary embodiment of the present application, a new round starts at every pre-set period to change the roles of the respective mesh terminals.

FIG. 2 is a flow chart illustrating the process of discriminating roles of the mesh terminals into the AM terminals and the SSM terminals in the power resource using method according to an exemplary embodiment of the present application.

With reference to FIG. 2, in the exemplary embodiment of the present application, in order to classify the mesh terminals constituting the wireless mesh network into AM terminals and SSM terminals, each mesh terminal periodically transmits its single-hop neighbor information and a metric value for its selection as the AM terminal to the root terminal (S110). Upon receiving the information, the root terminal constructs network topology information (S120).

The metric value is calculated by Equation 1 shown below:

$$P_{score} = \alpha E_{residual} + \beta\left(1 - \frac{C_{count}}{N_{round}}\right) + \gamma\left(\frac{1}{n}\sum_{i=1}^{n} Q_i\right) \quad \text{[Equation 1]}$$

With reference to Equation 1, the metric value $P_{score}$ is formed by the sum of three items. Here, $\alpha$, $\beta$, and $\gamma$ are weight values for determining a reflection rate of the three items and have a value ranging from a minimum 0 to a maximum 1, respectively. The sum of the three values is 1.

The first item $E_{residual}$ of the metric value refers to the amount of a residual power resource. A value normalized between 0 and 1 is used as the value of $E_{residual}$. Namely, as a terminal has more residual power, it has a value close to 1. If power resource of the mesh terminals can be rechargeable, the value refers to the amount of residual power until before recharging is performed. Namely, when the terminal is power-supplemented by being recharged, the value $E_{residual}$ is recovered to 1.

The second item $$1 - \frac{C_{count}}{N_{round}}$$

of the metric value refers to a ratio of participation of each mesh terminal as an active mesh terminal during the overall round so far. In Equation 1, as the value of the second item, a value obtained by subtracting the participation rate of the AM terminal from 1 is used. Thus, the value of the second item decreases as each terminal has participated as an AM terminal, and increases as each terminal has performed the role as AM.

The third item $$\frac{1}{n} \sum_{l=1}^{n} Q_l$$

of the metric value refers to quality of a radio link, in which 'n' is the number of neighboring terminals connected to each mesh terminal and $Q_l$ refers to individual link quality with each neighboring terminal. As $Q_l$, a value normalized between 0 and 1 is used. The third item, which is obtained by adding all the quality values of neighbor links and then dividing the resultant value by the entire number, is the average link quality of neighboring terminals connected to each mesh terminal. Thus, as a mesh terminal has more good quality links with neighboring terminals, the value of the third item increases.

As a result, if a mesh terminal currently has much residual power resource, has been participated as an active mesh by a smaller number of times, and has a good link quality with neighboring terminals, it has a large metric value and thus has a high possibility of being selected as an AM terminal afterward. The metric value is normalized as a value between 0 and 1.

When the root terminal collects information from the respective mesh terminals and reconfigures the network topology, the root terminal selects an optimum active mesh terminal based on the constructed topology information and the metric value (S130).

Figure 3:
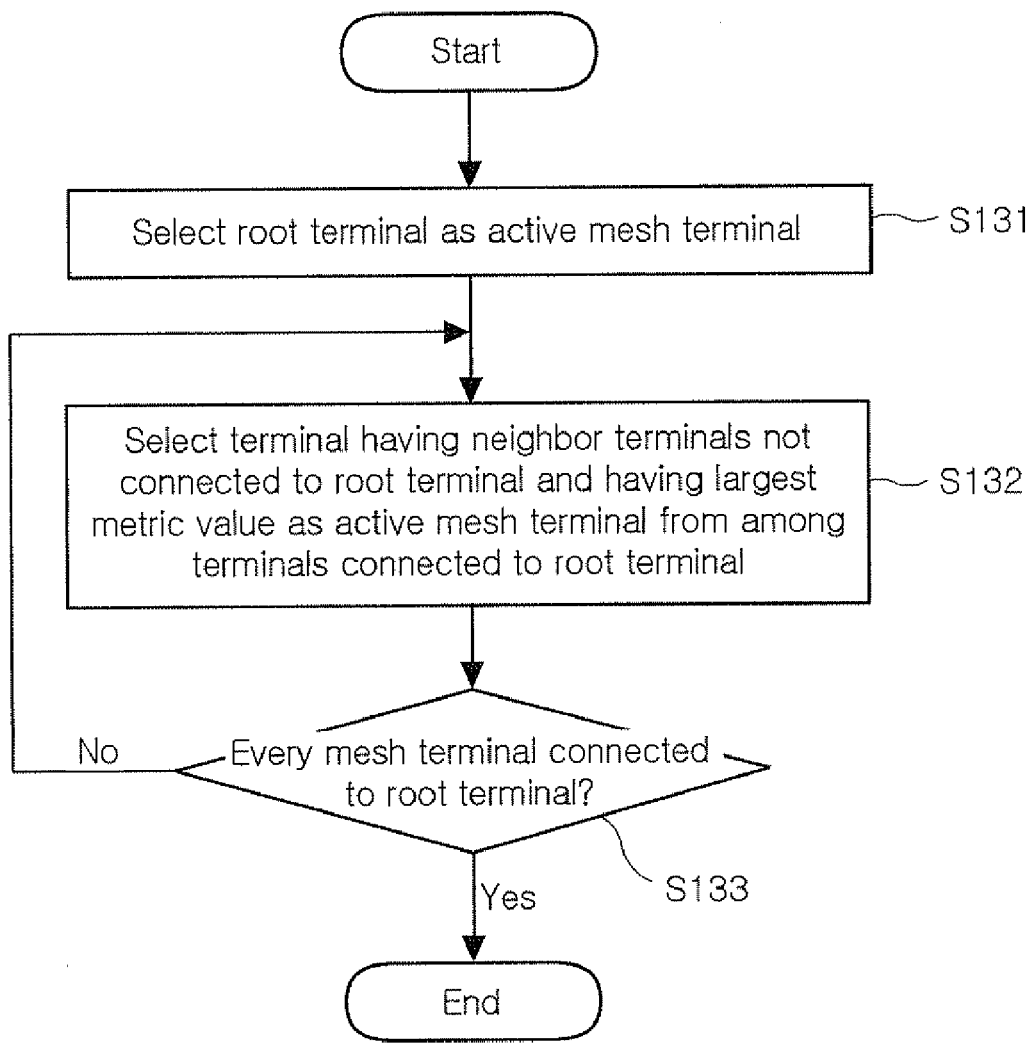
FIG. 3 is a flow chart illustrating the process of selecting an active mesh in the power resource using method in a wireless mesh network according to an exemplary embodiment of the present application.

FIG. 3 is a flow chart illustrating the step S130 of selecting an AM terminal in detail.

The method of selecting an AM terminal will now be described with reference to FIG. 3. In the exemplary embodiment of the present application, three sets of $S_A$, $S_C$, and $S_D$ are defined for AM selections. $S_A$ is a set of terminals selected as AM terminals, $S_C$ is a set of mesh terminals connected to a root terminal by the AM terminals, namely, a set of SSM terminals, and $S_D$ is a set of terminals which have not yet been connected to the root terminal. At an initial stage, all the mesh terminals are included in the set $S_D$, and $S_A$ and $S_C$ are null sets.

In the exemplary embodiment of the present application, at the initial stage, the root terminal is included in the set $S_A$ and every single hop neighboring terminals of the root terminal are moved from the set $S_D$ to the set $S_C$ (S131). Next, from among the terminals which are included in the set $S_C$ but not yet in the set $S_A$, a next AM terminal is selected (S132). In more detail, a terminal having one or more neighboring terminals included in the set $S_D$ and having the highest metric value ($P_{score}$) is selected as an AM terminal. The terminal selected as the AM terminal is moved to the set $S_A$, and every single hop neighboring terminal of the terminal selected as the AM terminal is also moved from the set $S_D$ to the set $S_C$. This AM selecting process is repeatedly performed until such time as the set SD becomes a null set (S133). After every AM terminal is selected through such process, an extra AM terminal is additionally selected to make the routing path distributed without being concentrated on terminals. Accordingly, in this manner, the AM terminals can be suitably selected to support the optimum power resource while maintaining the performance of the network.

With reference back to FIG. 2, when all the AM terminals are selected in one round, the root terminal provides the AM information selected in step S130 to every mesh terminal in the wireless mesh network (S140). The AM selecting information may be included in a root notification message (i.e., root announcement) and transmitted (S140).

Figure 7:
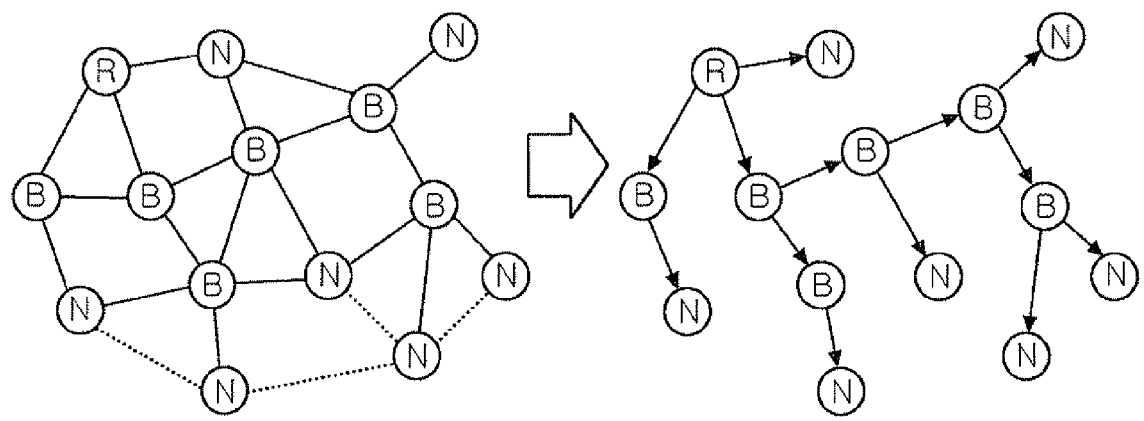
FIG. 7 illustrates the generation of a routing path in the power resource using method of a wireless mesh network according to an exemplary embodiment of the present application.

FIG. 7 illustrates generation of a routing path in a tree form through the AM terminals selected in the above-described process.

As shown in FIG. 7, B indicates the AM terminals selected, R indicates the root terminal, and N indicates the other remaining terminals, namely, the SSM terminals in each round.

Upon receiving the root notification message including the AM selection information, the SSM terminals (N) become the leaf nodes of the tree and the AM terminals become branch nodes of the tree according to the AM selection information, generating a routing path in the tree form. In the routing path, only the mesh terminals selected as the AM terminals perform retransmission.

Figure 8:
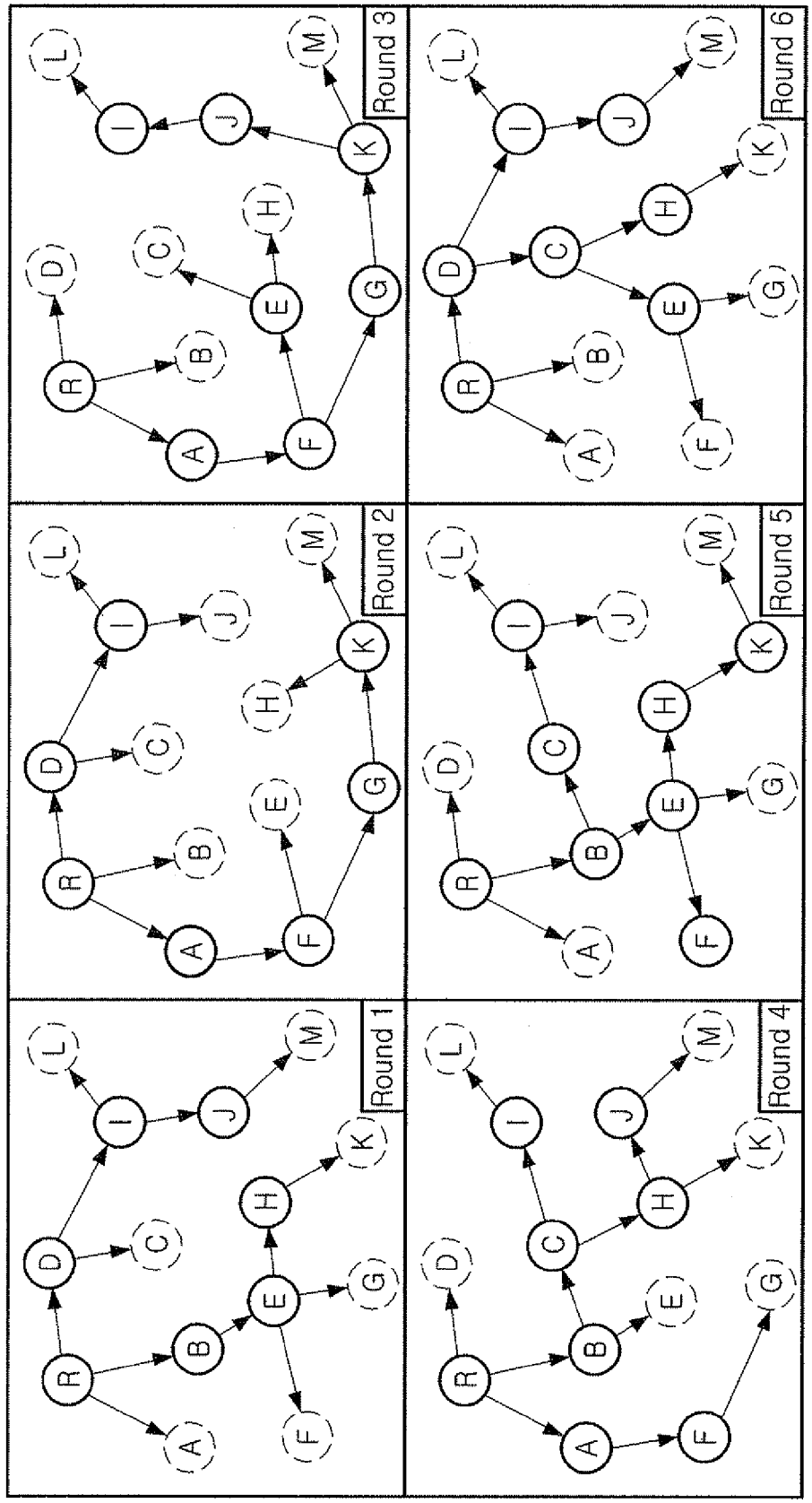
FIG. 8 illustrates how active mesh terminals and a routing path change in each round based on the power resource using method in a wireless mesh network according to an exemplary embodiment of the present application.

FIG. 8 illustrates how AM terminals and a routing path change in each round based on the method of using power resource according to an exemplary embodiment of the present application. In FIG. 8, R is the root terminal, A to M are mesh terminals, a solid line circle represents the mesh terminals selected as the AM terminals, and a dotted line circle represents the mesh terminals selected as the SSM terminals.

With reference to FIG. 8, as it proceeds from the round 1 to round 6, the respective mesh terminals are suitably selected as the AM terminals and the SSM terminals, rather than being fixed to a single role, and accordingly, the routing path is changed.

As a result, in the exemplary embodiment of the present application, the AM, namely, the data relay role, is not concentrated to a particular mesh terminal but evenly distributed to the multiple terminals, thereby optimizing power consumption as well as preventing degradation of network performance.

In an exemplary embodiment of the present application, although the level of power saving mode is determined according to the role of each mesh terminal, namely, whether it is the AM terminal or the SSM terminal, but preferably, the role of each mesh terminal is varied according to the surroundings. Namely, if a terminal does not actually make a data transmission, even if it is an AM terminal, the terminal may be changed to the power saving mode of a high level to save power resources. In this case, maintained in the high level of power saving mode, if the terminal has data to be transmitted or receives data from a neighboring terminal, the terminal may immediately return to the original low level of power saving mode, to avoid degradation of network performance (delay time, throughput, etc.). Also, even an SSM terminal, if its amount of transmission/reception data as generated is increased, the SSM terminal may be changed to the low level of power saving mode to enable more effective network operation.

For example, it is assumed that the respective mesh terminals in the wireless mesh network each have three power saving modes: a light sleep (LS) mode, a semi-deep sleep (SS) mode, and a deep sleep (DS) mode. Here, the SS mode has the same basic operation as that of the DS mode but it has a DTIM period shorter than that of the DS mode and longer than a beacon period of the LS mode.

Basically, at an initial stage, each mesh terminal selects the DS mode, and as the amount of data generation is increased, the mesh terminals lower their power saving mode to the SS mode or the LS mode to quickly process more data. Conversely, if the amount of data generation is reduced, the mesh terminals raise their power saving mode to the SS mode and the DS mode to save more power resource. When the power saving mode is changed according to the amount of data generation, the mode conversion is sequentially transmitted along the path of data transmission.

Figure 4:
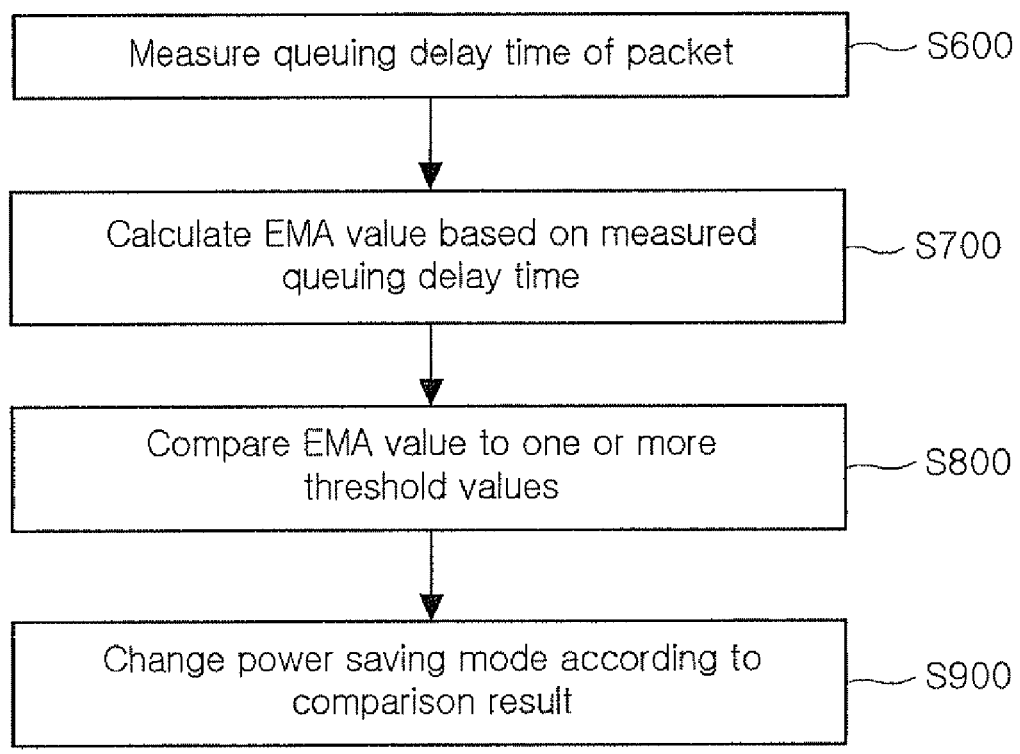
FIG. 4 is a flow chart illustrating the process of changing a power saving mode according to the amount of generated data in the power resource using method in a wireless mesh network according to an exemplary embodiment of the present application.

FIG. 4 is a flow chart illustrating the power resource using method according to an exemplary embodiment of the present application, specifically showing the process of changing a power saving mode according to the amount of generated data and a transmission path. The process of FIG. 4 is independently performed while data transmission is made along a routing path, in which the levels of power saving modes set depending on the discriminated roles can be properly varied according to data generation and transmission paths.

With reference to FIG. 4, in the exemplary embodiment of the present application, each mesh terminal measures a queuing delay time of a data packet to measure the amount of generated data (S600). The queuing delay time is defined as a time difference between a point when a data packet comes in a packet queue of a mesh terminal and a point when the data packet comes out of the packet queue but is not yet transmitted to a different terminal. Each terminal calculates an exponentially weighted moving average (EMA) as represented by Equation 2 below based on a queuing delay time calculated over each packet (S700).

$$EMA_{cur} = EMA_{prev} + \alpha S(QsDelay_{cur} - EMA_{prev})$$ [Equation 2]

In Equation 2, $EMA_{prev}$ is a previously calculated EMA value, $QsDelay_{cur}$ a queuing delay time of a current packet, $\alpha$ is a parameter for determining how many pieces of data so far are to be reflected, which is $$\alpha = \frac{2}{(1+N)}.$$

Here, N is the number of pieces of data to be reflected, which is N number of latest data.

That is, the larger the EMA value is, the more the amount of data delay in the current packet queue is.

The calculated EMA value is compared to a pre-set threshold value (S800), and the power saving mode of the terminal is changed to a higher or lower level according to the comparison result (S900).

Figure 9:
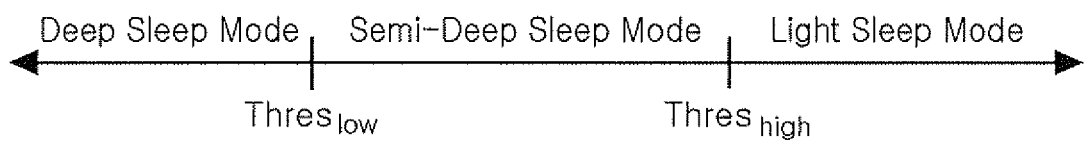
FIG. 9 illustrates changing of a power saving mode according to the amount of generated data in the power resource using method in a wireless mesh network according to an exemplary embodiment of the present application.

FIG. 9 illustrates changing a power saving mode according to the amount of generated data. In an exemplary embodiment hereinafter, the threshold value includes a first threshold value $Thres_{low}$, and a second threshold value $Thres_{high}$. The first threshold value $Thres_{low}$ has a lower EMA value than that of the second threshold value $Thres_{high}$.

With reference to FIG. 9, if the calculated EMA value is increased to be larger than the first threshold value $Thres_{low}$ according to the comparison result in step S800 and the terminal is currently in the DS mode, the terminal is changed to the SS mode, and if the EMA value continues to increase to be larger than the second threshold value $Thres_{high}$, the terminal is changed from the SS mode to the LS mode.

Conversely, if an EMA value of a terminal in the LS mode is reduced to be smaller than the second threshold value $Thres_{high}$, the terminal is changed from the LS mode to the SS mode, and if the EMA value continues to decrease to be smaller than the first threshold value $Thres_{low}$, the terminal is changed from the LS mode to the DS mode.

Accordingly, because the level of the power saving mode is suitably changed according to the amount of generated data, a data transmission delay cannot be increased.

The power resource using method in the wireless mesh network according to the exemplary embodiments of the present application described so far may be implemented as a program and stored in a computer-readable recording medium.

As set forth above, according to exemplary embodiments of the invention, the level of a power saving mode of mesh terminals can be changed in consideration of a changing power state of the mesh terminals as well as a network connection state, and also the power saving modes of the mesh terminals can be changed based on a request according to a data flow and the amount of data generation in the network. Thus, optimum performance can be provided to the wireless mesh network while ensuring optimum power efficiency for each mesh terminal.

In addition, because the power saving mode effective for each terminal is selected, an occurrence of a phenomenon whereby the power resources of the terminals are depleted and fail to maintain the structure of the network can be prevented, and thus, the duration of the overall network's existence can be lengthened.

While the present application has been shown and described in connection with the exemplary embodiments, it will be apparent to those skilled in the art that modifications and variations can be made without departing from the spirit and scope of the invention as defined by the appended claims.

What is claimed is:

1. A method for managing power resource in a wireless mesh network having a root terminal and a plurality of mesh terminals, the method comprising:

receiving, in the root terminal, neighbor information from mesh terminals of the plurality of mesh terminals, the neighbor information including information on single-hop neighbor terminals of each mesh terminal;

generating a routing path through the mesh network by selecting mesh terminals forming a tree form through the mesh network based on the received neighbor information;

configuring the selected mesh terminals as active mesh terminals that perform a data relay function and configuring the remaining mesh terminals of the plurality of mesh terminals as super-saving mesh terminals that do not perform a data relay function;

setting power saving modes such that a power saving mode of the super-saving mesh terminals configured not to perform the data relay function includes a shorter active period than the power saving mode of the active mesh terminals configured to perform the data relay function; and transferring data along the generated routing path while the active mesh terminals are in an active state, wherein the respective steps are repeatedly performed at every certain period.

2. The method of claim 1, wherein in the generating the routing path, the mesh terminals are selected to form a tree form such that all mesh terminals of the plurality of mesh terminals are a single hop distance from one or more mesh terminals selected to form the tree form.

3. The method of claim 1, wherein, while the super-saving mesh terminals are in an active state, a maximum backoff time duration of the mesh terminals selected as the active mesh terminals is set to be longer than that of the mesh terminals selected as the super-saving mesh terminals to give priority of accessing radio resources to the super-saving mesh terminals.

4. The method of claim 1, wherein the method further comprises:

receiving from each mesh terminal, in the root terminal, a metric value for selection of an active mesh terminal; and transmitting, from the root terminal, routing path selection information to every mesh terminal, wherein in the generating the routing path, the mesh terminals forming a tree form are selected based on the received neighbor information and the receive metric value for selection of an active mesh terminal.

5. A method for using power resource in a wireless mesh network, the method comprising:

a role discriminating step of discriminating mesh terminals into active mesh terminals that are to perform a data relay function and super-saving mesh terminals that are not to perform a data relay function in consideration of a network topology;

a power saving mode setting step of setting power saving modes such that a power saving mode of the mesh terminals selected as the super-saving mesh terminals is higher than that of the mesh terminals selected as the active mesh terminals;

a routing path generating step of generating a routing path in a tree form along the mesh terminals selected as the active mesh terminals; and a data transmission step of transferring data along the generated routing path while the mesh terminals are in an active state, wherein the respective steps are repeatedly performed at every certain period, wherein the role discriminating step comprises:

periodically transmitting, by each mesh terminal, its single hop neighbor information and a metric value for selection of an active mesh terminal to a root terminal;

constructing, by the root terminal, network topology information based on information received from each mesh terminal;

selecting, by the root terminal, an active mesh terminal based on the constructed network topology information; and providing, by the root terminal, active mesh terminal selection information to every mesh terminal, and wherein the metric value is defined by the sum of the amount of residual power resource of each mesh terminal, a ratio of the terminals participating as the active mesh terminals, and link average quality with neighboring terminals.

6. The method of claim 5, wherein the metric value is calculated by equation shown below:

$$P_{score} = \alpha E_{residual} + \beta\left(1 - \frac{C_{count}}{N_{round}}\right) + \gamma\left(\frac{1}{n}\sum_{l=1}^{n}Q_l\right)$$

wherein $\alpha$, $\beta$, and $\gamma$ and are weight values for determining a reflection rate of each item (i.e., clause), $E_{residual}$ is the amount of residual power resource of each mesh terminal, $$1 - \frac{C_{count}}{N_{round}}$$

is the rate of the mesh terminals participating as the active mesh terminals, $C_{count}$ is the number by which the mesh terminals are selected as the mesh terminals, $N_{round}$ is a total number of repeatedly performing the role discriminating step, and $$\frac{1}{n}\sum_{l=1}^{n}Q_l$$

is average quality of radio links in which 'n' is the number of neighboring terminals connected to each mesh terminal and Q1 is individual link quality with each neighboring terminal.

7. The method of claim 4, wherein the selecting of the mesh terminals forming a tree form comprises:

defining a set $S_A$ of terminals selected as active mesh terminals, a set $S_C$ of mesh terminals connected to the root terminal by the active mesh terminals, and a set $S_D$ of terminals which are not yet connected to the root terminal;

including the root terminal in the set $S_A$ and moving every single hop neighboring terminal of the root terminal from the set $S_D$ to the set $S_C$;

selecting a terminal having one or more neighboring terminals included in the set $S_D$ and having the highest metric value, as an active mesh terminal from the terminals included in the set $S_C$; and moving the terminal selected as the active mesh terminal to the set $S_A$ and moving all the single hop neighboring terminals of the terminal selected as the active mesh terminal from the set $S_D$ to the set $S_C$;

repeatedly performing selecting the active mesh terminal until such time as the set $S_D$ becomes a null set; and when the set $S_D$ becomes a null set, selecting an additional active mesh terminal from the terminals included in the set $S_C$ to distribute a routing path.

8. The method of claim 4, wherein, in transmitting from the root terminal the routing path selection information to every mesh terminal, the routing path selection information is included in a route announcement packet and transmitted to every mesh terminal.

9. The method of claim 1, further comprising:
a power saving mode changing step of changing, by each mesh terminal, its level of the power saving mode according to the amount of generated data while data is being transferred along the generated routing path.

10. A method for using power resource in a wireless mesh network, the method comprising:
a role discriminating step of discriminating mesh terminals into active mesh terminals that are to perform a data relay function and super-saving mesh terminals that are not to perform a data relay function in consideration of a network topology;
a power saving mode setting step of setting power saving modes such that a power saving mode of the mesh terminals selected as the super-saving mesh terminals is higher than that of the mesh terminals selected as the active mesh terminals;
a routing path generating step of generating a routing path in a tree form along the mesh terminals selected as the active mesh terminals;
a data transmission step of transferring data along the generated routing path while the mesh terminals are in an active state; and
a power saving mode changing step of changing, by each mesh terminal, its level of the power saving mode according to the amount of generated data while data is being transferred along the generated routing path,
wherein the respective steps are repeatedly performed at every certain period, and
wherein the power saving mode changing step comprises:
measuring, by the mesh terminal, a queuing delay time of a data packet;
calculating an exponentially weighted moving average (EMA) based on the measured queuing delay time;
comparing the calculated EMA with one or more pre-set threshold values; and
changing the power saving mode of the mesh terminal to a higher or lower level according to the comparison result.

11. The method of claim 10, wherein the queuing delay time is a time difference between a point when the data packet comes in a packet queue of the mesh terminal and a point when the data packet comes out of the packet queue but is not yet transmitted to a different mesh terminal.

12. The method of claim 10, wherein the EMA value is calculated by equation shown below:

$$EMA_{cur} = EMA_{prev} + \alpha S(QsDelay_{cur} - EMA_{prev})$$

wherein $EMA_{prev}$ a previously calculated EMA, $QsDelay_{cur}$ is a queuing delay time of a current packet, and '$\alpha$' is a parameter for determining how many pieces of the latest data are to be reflected $$\alpha = \frac{2}{(1+N)},$$

wherein 'N' is the number of pieces of data to be reflected).

* * * * *